(12) United States Patent
Kersey et al.

(10) Patent No.: US 7,506,368 B1
(45) Date of Patent: Mar. 17, 2009

(54) METHODS AND APPARATUS FOR NETWORK COMMUNICATIONS VIA A TRANSPARENT SECURITY PROXY

(75) Inventors: Edward C. Kersey, Alpharetta, GA (US); James W. O'Toole, Jr., Somerville, MA (US); Bradley Dale Dike, Marietta, GA (US); Patrick Darrell Tate, Dunwoody, GA (US); Eric A. Fritzges, Austell, GA (US); Andre Justin Pecqueur, Roswell, GA (US); Bruce F. Wong, Athens, GA (US); Hema M. Prasad, Alpharetta, GA (US); Shaheed Bacchus, Athens, GA (US); Larry David Bisel, Canton, GA (US)

(73) Assignee: Cisco Technology, Inc., San Jose, CA (US)

( * ) Notice: Subject to any disclaimer, the term of this patent is extended or adjusted under 35 U.S.C. 154(b) by 823 days.

(21) Appl. No.: 10/365,940

(22) Filed: Feb. 13, 2003

(51) Int. Cl.
*G06F 9/00* (2006.01)
*G06F 15/16* (2006.01)
*G06F 17/00* (2006.01)

(52) U.S. Cl. ...................................... 726/12
(58) Field of Classification Search ............... None
See application file for complete search history.

(56) References Cited

U.S. PATENT DOCUMENTS

| | | | |
|---|---|---|---|
| 6,006,264 A * | 12/1999 | Colby et al. | 709/226 |
| 6,088,805 A * | 7/2000 | Davis et al. | 726/10 |
| 6,324,648 B1 * | 11/2001 | Grantges, Jr. | 726/12 |
| 6,363,479 B1 * | 3/2002 | Godfrey et al. | 713/160 |
| 6,415,323 B1 | 7/2002 | McCanne et al. | 709/225 |
| 6,449,647 B1 | 9/2002 | Colby et al. | 709/226 |
| 6,453,337 B2 | 9/2002 | Miller et al. | 709/204 |
| 6,457,045 B1 | 9/2002 | Hanson et al. | 709/206 |
| 6,463,466 B1 | 10/2002 | Weyer | 709/217 |
| 6,584,567 B1 * | 6/2003 | Bellwood et al. | 713/171 |
| 6,965,939 B2 * | 11/2005 | Cuomo et al. | 709/229 |
| 6,996,841 B2 * | 2/2006 | Kadyk et al. | 726/12 |
| 7,149,892 B2 * | 12/2006 | Freed et al. | 713/151 |

(Continued)

OTHER PUBLICATIONS

Cunchon et al., WO 01/56247 A1, Aug. 2, 2001 (this is the PCT that US Pub. No. 2002/0162024 claims priority to as the filing date).*

(Continued)

*Primary Examiner*—Emmanuel L Moise
*Assistant Examiner*—Nadia Khoshnoodi
(74) *Attorney, Agent, or Firm*—BainwoodHuang

(57) ABSTRACT

A data security device for providing a network transport connection via a transparent network proxy that employs different encryption security mediums along a communications session between two endpoints by emulating one of the endpoints at an intermediate node such that the communication session appears as an atomic, secure connection to the endpoints yet provides appropriate security over the end-to-end connection. A sender node sends a connection request to establish a secure communication session with an intended receiver node. A transparent proxy on an intermediate node receives the request and establishes the link employing an encryption mechanism. The transparent proxy establishes a second link with the intended receiver, and applies a second, less expensive encryption mechanism. The transparent proxy combines the two links to form the trusted, secure connection but incurring only the mitigated expense over the second link.

12 Claims, 7 Drawing Sheets

U.S. PATENT DOCUMENTS

2002/0162024 A1* 10/2002 Chnchon et al. ............ 713/201
2004/0015725 A1* 1/2004 Boneh et al. ................ 713/201

OTHER PUBLICATIONS

BIG-IP® Solutions Guide, pp. i-xii and 9-1-9-20, ©2002, http://support.dell.com/support/edocs/software/pebigip/BIGip_sol.pdf.
SonicWALL—SSL, printed Jan. 10, 2003, http://www.sonicwall.com/applications/ssl.html.
SonicWALL—SSL Offloaders, printed Jan. 10, 2003, http://www.sonicwall.com/products/ssl.html.
SonicWALL—SSL-R, printed Jan. 10, 2003, http://www.sonicwall.com/products/sslr.html.
SonicWALL SSL Offloading Solutions, A White Paper by Sonic WAll, Inc., pp. 1-11, http://www.sonicwall.com.
SonicWALL SSL-RX, printed Jan. 10, 2003, http://www.sonicwall.com/products/sslrx.html.
SonicWALL SSL-R3 and SSL-R6, printed Jan. 10, 2003, http://www.sonicwall.com/products/sslr3.html.

* cited by examiner

METHODS AND APPARATUS FOR NETWORK COMMUNICATIONS VIA A TRANSPARENT SECURITY PROXY

BACKGROUND OF THE INVENTION

Companies often employ data security techniques with computer networks to maintain privacy and integrity of the data traveling through such networks. Such data travels via a variety of physical paths and transmission mediums from sources to destinations. As the network transmissions travel from the source to the destination, they are subject to a variety of security threats. Such threats include loss of privacy, loss of data integrity, identity spoofing, and denial of service, to name several. Other threats are present and known to those skilled in the art.

Such threats may compromise the data traveling through the network in various ways. For example, a loss of privacy attack includes a fairly simple "sniffer" application running on a node through which data travels. The sniffer reads the information in a noninvasive manner and is undetectable to the sender and the receiver. Another example is an integrity attack, in which an intruder modifies someone else's data traveling through a network (e.g., altering a balance amount in a bank deposit transaction). This type of attack differs from a privacy attack, for example, because although a user might not care if their transaction is known, the user probably would not want others to be able to modify the transaction. Yet another example is an Authentication attack which deals with identity spoofing, or altering the apparent sender or receiver of a transaction. Unauthorized Internet use of a credit card represents a typical authentication attack, in which an unauthorized imposter purports to be the true holder of the card.

There are a variety of conventional methods for implementing security techniques to guard against security threats. Typical methods include applying cryptographic operations such as encryption and authentication to the data. A user may employ a variety of cryptographic operations, also known as ciphers, to the data. A user selects a cipher based on several factors, including the type of transmission protocol, the perceived security threat and type, the processing power available for cryptographic operations, and the data throughput performance desired. Each of the ciphers has encryption variables that affect these factors. The variables include the number of encryption bits (key size), the number of authentication bits, whether the communications use symmetric or public keys, and whether the cipher is acceptable based on legal and/or practical criteria such as export laws, technical interoperability, and other legal requirements concerning the use of cryptographic ciphers.

In general, the cryptographic operations involve applying mathematical convolutions to the data to render it in an encrypted form. The encrypted form (ciphertext, or "black" data) protects against security attacks, unlike the non-encrypted form, also called plaintext, or "red" data, which is readable by the casual observer. In a crytographic operation, the sender applies a mathematical cryptographic function to the data to generate the ciphertext, transmits the data, and the receiver applies the inverse cryptographic function to recover the plaintext. Such use of ciphertext data protects communications from such security attacks.

The encryption operations typically employ mathematically intensive computations using keys, or predetermined numerical values selected according to the cipher. Such encryption operations include, for example, one-way trap door functions that involve factoring large prime numbers. The security of the encryption rests on the notion that substantial computational resources are required to decrypt, or compute the inverse cryptographic function, without the key. Accordingly, an attacker finds it computationally infeasible to intercept and decrypt a message (e.g. "crack the code") without the key. Note that encryption and authentication involve similar operations. However, a user typically employs encryption to represent data in an unintelligible form to protect confidentiality (privacy attack), while a user typically employs authentication to verify integrity, i.e. ensuring sender identity and that the data has not been modified. Accordingly, "encryption" refers to cryptographic functions which a user employs for encoding transmitted data for security reasons such as encryption or authentication, or both.

An encryption key has a certain number of bits. Generally, a larger key having a greater number of bits provides stronger security, but also imposes a more computationally intensive encryption operation, therefore reducing throughput due to overhead. Accordingly, encryption ciphers typically specify encryption variables including the number of bits. The user specifies an encryption medium having an appropriate level of security by selecting the number of bits based on the threat of attack and the computation resources available, as well as the throughput requirements. Because of the computationally expensive nature of such encryption operations, the computing resources available are often a limiting factor in the degree of security that the specified encryption medium applies to a given connection while still maintaining required throughput.

One conventional approach employs a Secure Socket Layer (SSL) protocol to define a secure connection. SSL defines a mechanism to specify and coordinate encryption ciphers and the associated encryption variables for a secure connection between users. A user employs SSL via a handshaking exchange that computes a session key to be employed for encryption functions for the duration of the connection. However, SSL operations impose throughput constraints because of the computationally intensive nature of the encryption. Specifically, the SSL handshake requires substantial processing to set up the SSL connection. Further, the endpoint computing devices perform the SSL handshake between each pair of users employing a connection, imposing the SSL setup/teardown for each end-to-end connection between users.

Other conventional methods include IPsec/IPv4. IPsec, however, implements security at the network level (layer 3) of the OSI model. SSL, on the contrary, is implemented above layer 4 (session) level. While both approaches are aimed at preventing the content of the payload to be intercepted by a non-terminating device, SSL remains more content oriented. In other words, IPsec-based security generally will not invade the content corresponding to the upper layers, while SSL will generally prevent the content routing and content switching products from recognizing items such as URL strings, cookies, and other strings in the TCP/IP payload of datagrams.

One conventional approach attempts to offload SSL security overhead onto an alternate device. Such SSL offloaders typically break the TCP/IP connection from an initiating client to an intended receiver, decrypt the data in the offloader, and retransmit the data to the intended recipient. However, this conventional approach generates a separate connection from the SSL offloader itself to the intended recipient. The new connection appears to the intended receiver as a connection from the SSL offloader, not as a connection from the client (or server) node that initiated the connection to the SSL offloader. Further, conventional approaches delegate SSL termination only, and are not concerned with a mechanism to implement security from the SSL offloader to the intended recipient. One conventional device that operates in a manner similar to that described above is the SSL-Rx family of SSL Accelerators, marketed commercially by Sonicwall, Inc., of Sunnyvale, Calif.

SUMMARY

Unfortunately, there are deficiencies with the above-described SSL implementation because the SSL connection is broken at the SSL offloader. Such SSL offloading makes no provision for continuing the secure communication to the receiver. Further, the SSL handshake and encryption overhead still occurs for each sender/receiver pair that establish a connection. In a client/server environment, for example, a plurality of servers in a parallel server bank typically are available to serve a client. The SSL connection overhead occurs, therefore, for each server engaged by the client, however, does not provide security along the entire path from the client to the server because the SSL connection is broken at the SSL offloader. A new connection is required from the SSL offloader to the server. Therefore, the intended receiver generally requires modifications to expect this additional connection from the SSL offloader rather than from the client. Alternatively, a particular implementation employs a second SSL offloader to initiate and terminate the offloaded connection, however this approach requires deployment of SSL offloaders in pairs.

Further, a server administrator may dispose the servers on a trusted subnetwork or intranet that does not require the level of security that the encryption cipher on the SSL connection from the client mandates. It would be beneficial to implement an arrangement in which the client communicates via an intermediate device acting as a router or gatekeeper, beyond which the transmission employs an alternate security or encryption operation, such that the intermediate device provides a seamless alternative data security medium from the intermediate device to the servers.

In a typical SSL connection, a sender and a receiver establish a secure end-to-end connection. A handshaking operation occurs during which the sender and receiver exchange information about the encryption medium to be employed over the connection. The handshaking includes encryption variables such as the encryption cipher, the number of bits, and certificates including public keys. The sender and receiver compute a session key for the duration of the session between them based on the encryption variables. By way of example only, typical encryption/authentication ciphers include RSA, DES, Triple-DES, RC2, RC4, MD5, and DSA. Typical key sizes are 40, 80, 128, 168, 512, 256, and 1024. As indicated above, the security level (based on the difficulty to "crack" the code) and computational expense increase exponentially with the key size.

Often, however, the network link, or path, between the sender and the receiver is partially secure. A server that is part of an intranet such as a VPN (Virtual Private Network) or other subnetwork may be secure from the intermediate node, or gateway to the intranet, along the link to the server. The servers, for example, may be otherwise inaccessible except via the gateway node. Accordingly, the path requires a strong encryption medium only on the public access network link from the client to the intermediate node. The link from the intermediate node to the server or bank of servers is appropriate to employ an alternate data security medium. It would be beneficial, therefore, to allow a client to employ a particular data security medium on an SSL connection to an intermediate node acting as an entry point to an intranet, also called a frontend, and allow an alternate connection from the intermediate node to the server via the intranet, a so-called backend connection. Therefore, the client user need only incur the SSL overhead and handshake with respect to the frontend connection, while the backend connection employs a computationally less expensive, albeit adequate, data security medium over the intranet.

The invention is directed to techniques for providing a secure connection between multiple nodes using data security mediums that provide differing levels of security. For example, a first data security medium providing a high level of security may exist between a first node and a data communications device, while a second data security medium providing a low level of security may exist between the data communications device and a second node. As a result, a secure connection exists between the first and second nodes, but the data communications device (in a front-end manner) offloads much of the high level security overhead from the second node. Such offloading frees the second node so that the second node is now capable of performing other operations (e.g., more processing operations rather than security overhead operations).

In one arrangement, a sender node transmits a connection request to establish a secure communication session with an intended receiver node. A transparent proxy process on an intermediate node receives the request, establishes the link employing an encryption mechanism, and issues a positive acknowledgment to the sender node. The transparent proxy establishes a second link with the intended receiver node, and applies a second, less expensive, encryption mechanism that mitigates the encryption overhead. The transparent proxy combines the two links to form the secure connection but incurs only the mitigated processing expense over the second link. Accordingly, the receiver receives the benefit of a secure link over the entire secure connection but relies on the second security medium corresponding to the transparent proxy process to avoid the performance degradation of the first data security medium.

In a particular arrangement, the combining includes emulating the first node by a transparent proxy such that the second node views data traffic messages sent from the transparent proxy as trusted as data traffic messages sent from the first node. The transparent proxy described above may be provided, for example, by a Cisco CSS (Content Services Switch), marketed commercially by Cisco Systems, Inc., of San Jose, Calif. This arrangement allows the server process expecting the connection to remain unmodified since the incoming connection appears as if it emanated directly from the client.

The second data security medium, in a particular arrangement, is computationally less intensive than the first data security medium. Accordingly, this arrangement relieves the backend links, as a part of the secure intranet VPN, from performing the level of encryption required on the untrusted frontend links from the Internet. The second data security medium, in a particular configuration, includes generating, at the transparent proxy, a pseudo-credential (or "fake" credential) from a certificate sent from the first node, providing the pseudo-credential from the transparent proxy to the second node, and authenticating the transparent proxy as the first node via the pseudo-credential.

In another configuration, the second data security medium further includes indexing a flow entry in a flow table, and determining, based on a matching indexed flow entry, a corresponding flow. The flow table allows session key reuse by subdividing a connection into flows. The transparent proxy then saves and maps the flows for subsequent messages. Therefore, subsequent transmissions reuse connections by mapping to an existing flow and avoid the processing overhead to reestablish the second data security medium.

The second data security medium further includes defining a plurality of available ciphers from a cipher suite, identifying encryption strength variables corresponding to the available ciphers in the cipher suite and selecting an available cipher for applying as the second data security medium based on the encryption strength variables. Such encryption strength variables include, by way of example only, encryption key bits, encryption type, authentication type, exportability, symmetry. This selection allows an appropriate level of encryption independently of the frontend encryption.

In another configuration, the first node corresponds to a client process and the second node corresponds to a server farm disposed in an intranet operable to receive concurrent data traffic messages from a plurality of clients, in which the second data security medium corresponds to a security level of the intranet. Therefore, the first and second data security mediums need not be the same and the device selects and applies the security mediums independently. Further, in another alternate arrangement, the first data security medium and the second data security medium correspond independently to a respective protocol indicative of a predetermined handshaking operation for applying the respective data security medium, the respective protocols further comprising SSL (Secure Socket Layer) and IPsec/IPv4 (Internet Protocol Security/Internet Protocol Version 4). Therefore, an alternate protocol is enabled on the second security medium to provide a suitable security level over the intranet while retaining more robust security on the untrusted public network side.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

The invention is directed to techniques for providing a network transport connection via a transparent network proxy that employs different encryption security mediums along a communications session between two endpoints by emulating one of the endpoints at an intermediate node such that the communication session appears as an atomic, secure connection to the endpoint nodes yet provides appropriate security over the end-to-end connection. A sender node initiates a secure communication session with an intended receiver node. A transparent proxy process on the intermediate node receives the request, establishes the link employing an encryption mechanism, and issues a positive acknowledgment to the sender node. The transparent proxy establishes a second link with the intended receiver node, and applies a second, computationally less expensive, encryption mechanism. The transparent proxy combines the two links to form the secure connection but incurring only the mitigated computational expense over the second link.

In further detail, a pair of nodes, such as a client and a server, attempt to establish a secure, trusted connection. The client node is located on a public access network such as the Internet, and the server or servers are disposed on a subnetwork such as an intranet. The client initiates a secure connection request, such as an SSL connection request, by attempting an SSL handshake directed to the server employing a particular encryption cipher. An intermediate node, or proxy server, receives the connection request. The intermediate node is a gateway to the intranet including the server farm, in which the intranet is more trusted than the public access network from which the connection request emanates. The proxy server completes the connection request from the client to establish a communications link, and initiates a second connection, or link, to the server.

Because the communications link to the server is via the trusted intranet, an alternate level of security that incurs less computational expense and overhead may be selected. The server completes the link from the proxy server, and the proxy server associates the two communications links such that the proxy server appears to the server as the client initiated SSL connection. In this manner, the server need not duplicate the SSL handshake, does not require modification since the transmissions look like client SSL transmissions, and may transmit back to the proxy server without incurring the overhead otherwise required by the client SSL encryption cipher.

Figure 1:
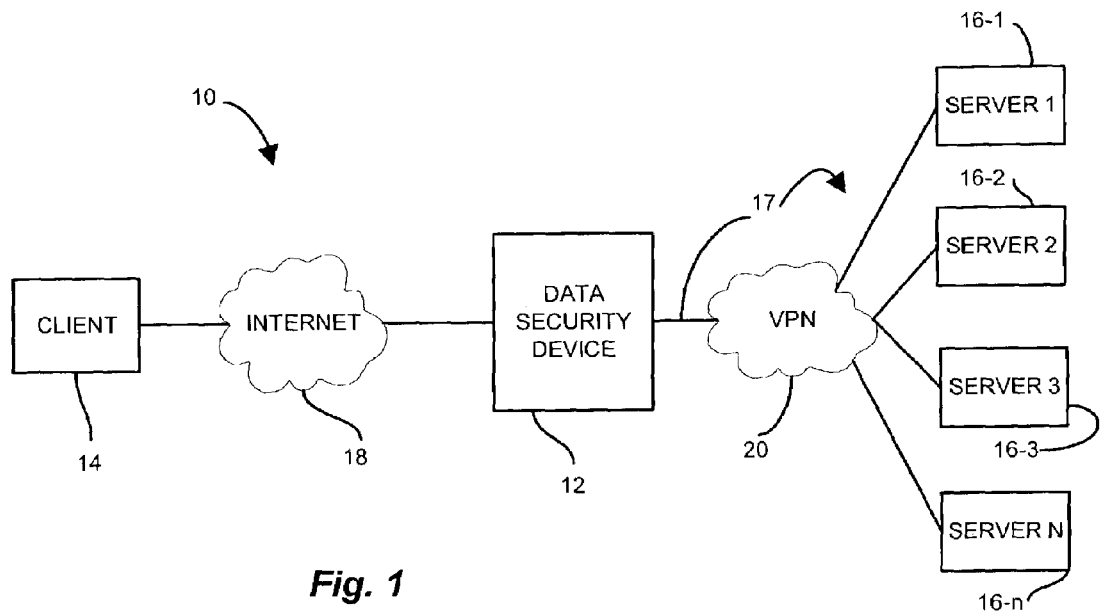
FIG. 1 is a context diagram of a communications system which is suitable for use with the present invention employing a data security device as defined herein.

FIG. 1 is a context diagram of a communications system 10 suitable for use with the present invention employing a data security device as defined herein. Referring to FIG. 1, the communications system 10 includes a data security device 12, at least one client 14 (14n generally), a public access network 18 such as the Internet, and a subnetwork such as a virtual private network (VPN) 20 or intranet. The communications system 10 further includes a transmission medium 17 (e.g., wires, fiber optic cables, wireless equipment and combinations thereof, etc.). The VPN 20 further includes one or more servers 16-1 to 16-n.

The data security device 12 is connected to the public access network 18, and also to the VPN 20. The servers 16-n are also connected to the VPN 20 by any suitable means, such the transmission medium 17. The transmission medium 17 interconnects the various elements as described herein. Clients 14n are connected to the data security device 12 via the public access network 18, also by a variety of conventional methods.

The data security device 12, in a particular configuration, is the gatekeeper to the VPN 20. The servers 16-n are otherwise inaccessible from the public access network 18. The VPN 20 is segregated from the network 18 by physical interconnections, firewalls, tunneling methods, and other security implementations. The clients 14n access the servers 16n via the data security device 12 through the network 18. In this manner, the data security device operates to manage and oversee data traffic messages and connections to the VPN 20 from the public access network 18. Therefore, the VPN 20 effectively protects the servers 16-*n* from security threats by maintaining a secure network as described above.

Figure 2:
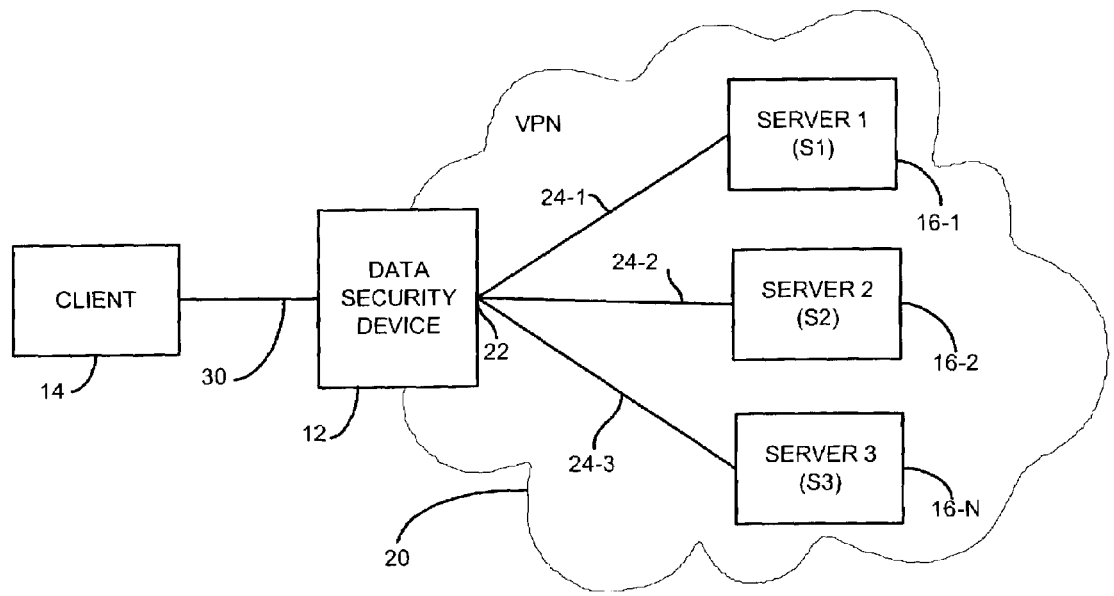
FIG. 2 is a block diagram of a data security device of the communications system of FIG. 1.

FIG. 2 is a block diagram of the data security device of FIG. 1 in communication with client and server processes. Referring to FIG. 2, the client 14 connects to the data security device 12 at a frontend link 30. The data security device 12 includes a single entry point 22 into the VPN 20. A plurality of backend links 24-1 to 24-3 (24-*n* generally) connect the servers 16-1 to 16-3 to the data security device 12 via the entry point 22.

In this manner, the VPN 20 imposes a trusted security zone onto the nodes 16-*n* within it, via the entry point 22. Since the nodes 16-*n* in the VPN 20 are within this trusted security zone, rather than the less secure public network 18, the VPN relieves the nodes 16-*n* of the need to individually generate secure connections providing the level of security required on the network 18, and therefore of the corresponding encryption overhead as well. Data traffic transmissions traveling to the data security device 12 are secure because of the first data security medium on the link 30 from the client. Data traffic transmissions emanating from the data security device 12 may rely on the security zone of the VPN 20, providing the second data security medium on the backend links 24-1 to 24-3 (24-*n* generally). Of course, individual nodes within the VPN 20 may employ additional encryption mediums to supplement the VPN 20 security zone as needed by the individual transactions. Accordingly, the frontend security does not encumber the backend servers 16-*n* and as a result, the servers 16-*n* are able to perform more throughput processing. In contrast, the conventional security methods described above typically require that the backend servers incur the encryption overhead, and therefore impose the overhead along the link within the intranet. Since the user trusts the intranet more than the public access network, such encryption is inefficient and redundant. However, since the server sees the transactions as emanating from the client, no server changes need occur to accept a transmission from the transparent proxy process 32 on behalf of the client 14.

Figure 3:
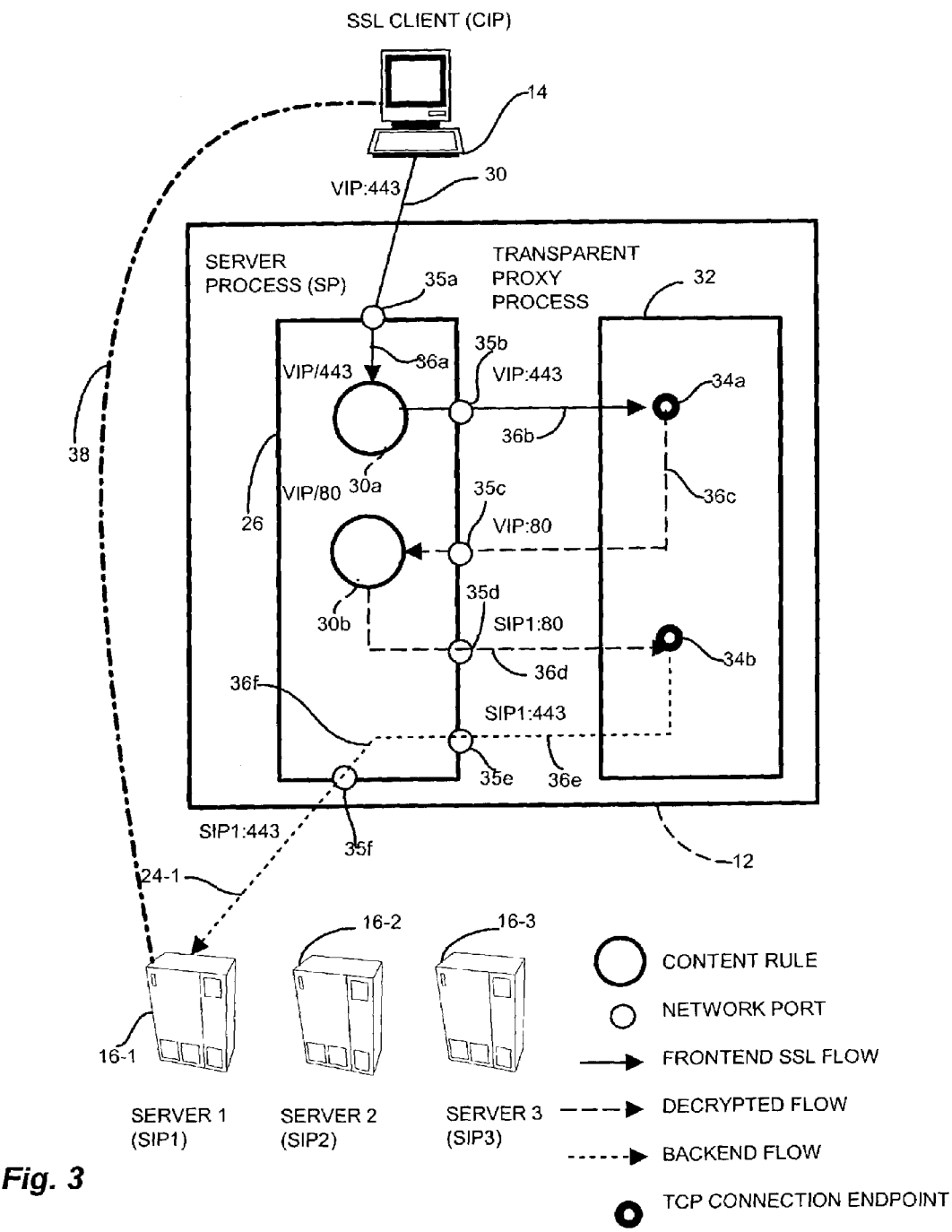
FIG. 3 is a data flow diagram of data through the data security device of FIG. 2.

FIG. 3 is a data flow diagram of data through the data security device of FIG. 2. Referring to FIG. 3, the data security device 12 is shown in more detail connected to the client 14 and the servers 16-*n*. The data security device 12 includes a server process 26 and a transparent proxy process 32. The server process 26 includes content rules 30*a* and 30*b*, for the frontend link 30 and backend links 24-*n*, respectively. The server process 26 includes a plurality of ports 35*a*-35*f* (35*n*, generally), and flows 36*a* to 36*f* (36*n*, generally). The transparent proxy process 32 includes endpoints 34*a* and 34*b*, corresponding to the frontend link 30 and backend links 24-*n*, respectively.

The frontend link 30 connects via port 35*a*, corresponding to flow 36*a*. Each of the flows 36*n* corresponds to a port 35*n*, and corresponds to a data traffic message through the data security device 12, as will be described further below. The flow 36*a* is coupled in turn to rule 30*a*, flow 36*b*, and frontend endpoint 34*a* in the transparent proxy process 32. The transparent proxy process 32 is further coupled to the backend rule 30*b*, by the flows 36*c* and 36*d*. The transparent proxy process further includes the backend endpoint 34*b*, coupled in turn to the server 16-1 via flows 36*e*, 36*f*, backend link 24-1, and ports 35*e* and 35*d*. Note that the first and second links (30, 24-1) and flows 36*a*-66*f* define a full secure connection 38 from the client 14 to the server. It should be further noted that the frontend and backend links 30 and 24-1, respectively, are merely labels for the ingress and egress flows 35*a* and 35*f*, respectively, and that data traffic messages follow a continuous path from link 30 to flow 36*a* and from flow 36*f* to link 24-1.

Continuing to refer to FIG. 3, the device 12 transmits data traffic messages sent from the client 14 to the server 16-1 on the path described below. Briefly, some conventions about FIG. 3 are as follows. The address designations are in the form IPaddress:port. As is known to those skilled in the art, port designations are defined in Internet RFC 1700, known to those skilled in the art, and typically refer to the type of content carried in a data traffic message. Generally, port 443 indicates encrypted SSL traffic and port 80 indicates HTTP (Hypertext Transfer Protocol) traffic. Other port numbers may be specified in alternate configurations. Rules 30*a* and 30*b* correspond to the frontend and backend, respectively. A rule (content rule) 30*a*, 30*b* performs message selection and routing within the data security device 12 according to the particular content of the message.

By way of example only, the content rules 30*a*, 30*b* are responsive to port number. Specifically, the frontend rule 30*a* examines and selects SSL traffic on port 443. Further, the backend rule 30*b* examines and selects HTTP traffic on port 80. Alternate configurations employ alternate rules based on the type of message traffic. Further, a rule 30*a*, 30*b* is optional and may not be implemented if the relevant flow does not perform content based filtering. It should be further noted that the backend rule 30*b* is adaptable to other types of message traffic, such as IPsec/IPv4, HTTPS, DHCP, DNS, X.400, LDAP, and others.

The client 14 transmits a data traffic message on the frontend (first) link 30, addressed with the virtual IP address of the data security device 12, VIP:443. The SSL handshaking has selected a cipher to employ for the first communication medium from the client 14 to the data security device 12. Port 35*a* receives the message, and frontend rule 30*a* forwards the message to the frontend TCP endpoint 34*a*, in the transparent proxy process 32, shown by SSL flows 36*a* and 36*b*. As indicated above, the incoming encrypted message employs the selected cipher corresponding to the SSL protocol, as is shown by the lines denoting the flows 36*a* and 36*b*. The transparent proxy process 32 decrypts the message at the endpoint 34*a*, to generate a decrypted, or plaintext message. The decrypted message is now readable to a casual observer, however, the transparent proxy process 32 will reencrypt the message according to the second communication medium before sending to the server 16-1, as will be described further below.

The transparent proxy process 32 sends the plaintext message back to the server process 26 at address VIP:80, indicating HTTP traffic on port 80. The proxy 32 does this by specifying a new plaintext connection back to the same VIP as the SSL content rule 30*a* but with a new port number (e.g., 80). The backend rule 30*b* receives the decrypted message via port 35*c*, as shown by flow 36*c*. The backend rule 30*b* has the same VIP as the frontend rule 30*a*, and sends the plaintext message back to the transparent proxy process 32 for retransmission with the IP address of the server 16-1. The transparent proxy process 32 receives the redirected plaintext message at the endpoint 34*b*, via port 35*d*, as shown by flow 36*d*.

The transparent proxy process 32 receives the plaintext flow 36*d*, and determines a connection outgoing from the backend endpoint to the server 16-1 on the backend link 24-1. As indicated above, the backend link 24-1 is a flow emanating from the security device 12 as flow 36*f*, on port 35*f*. The transparent proxy process 32 applies a second data security medium while establishing the backend connection. As indicated above, this second data security medium need not be the same as the first data security medium applied on the frontend link 30 from the client 14.

The transparent proxy process 32 has the identity (address) and the security credentials (certificate) of the client from the frontend link 30. Therefore, when applying the second data security medium, the transparent proxy process 32 stores the address of the client, and the security credentials, if needed, in the message so that the message will appear to the server as if it were sent directly by the client 14.

Continuing to refer to FIGS. 3 and 2, the second data security medium on the backend, in a particular configuration, is a less computationally intensive security medium than that applied on the frontend. Since the intranet, or backend network (VPN, 20), providing the backend link 24-1 is more trusted than the public access network 18 (FIG. 2) providing the frontend link 30, a data security medium incurring less overhead is acceptable. Such a second data security medium includes, in particular configurations, encryption variables having smaller key sizes (encryption and authentication bits), alternate encryption ciphers, and session keys with greater longevity. The second data security medium may also comprise a level of security inherent in the backend network 20 (FIG. 2). In a particular embodiment, session key reuse, described further below, employs a flow lookup in a flow entry table to reuse an SSL connection and avoid repeating the SSL handshaking exchange by looking up a predetermined session key established from a previous session.

The transparent proxy process 32, having determined a flow 36e on which to send the message, addresses the message using the server's IP address and the SSL port SIP:443. The transparent proxy process 32 sends the message to the session process 26, via port 35e, and the session process 26 sends the message via flow 36f, to outgoing port 35f. The server 16-1 receives the message on the backend link 24-1. Since the message is addressed as if it emanated from the client 14, and since the transparent proxy process 32 has applied the second data security medium including any security credentials corresponding to the connection established on the backend link 24-1, the server 16-1 receives the message as if it was sent directly from the client 14. In this manner, the server 16-1 sees the incoming message as if it were a secure connection 38 emanating from the client 14 and affords a similar level of trust as that provided by the frontend link 30 employing the first data security medium.

Figure 4A:
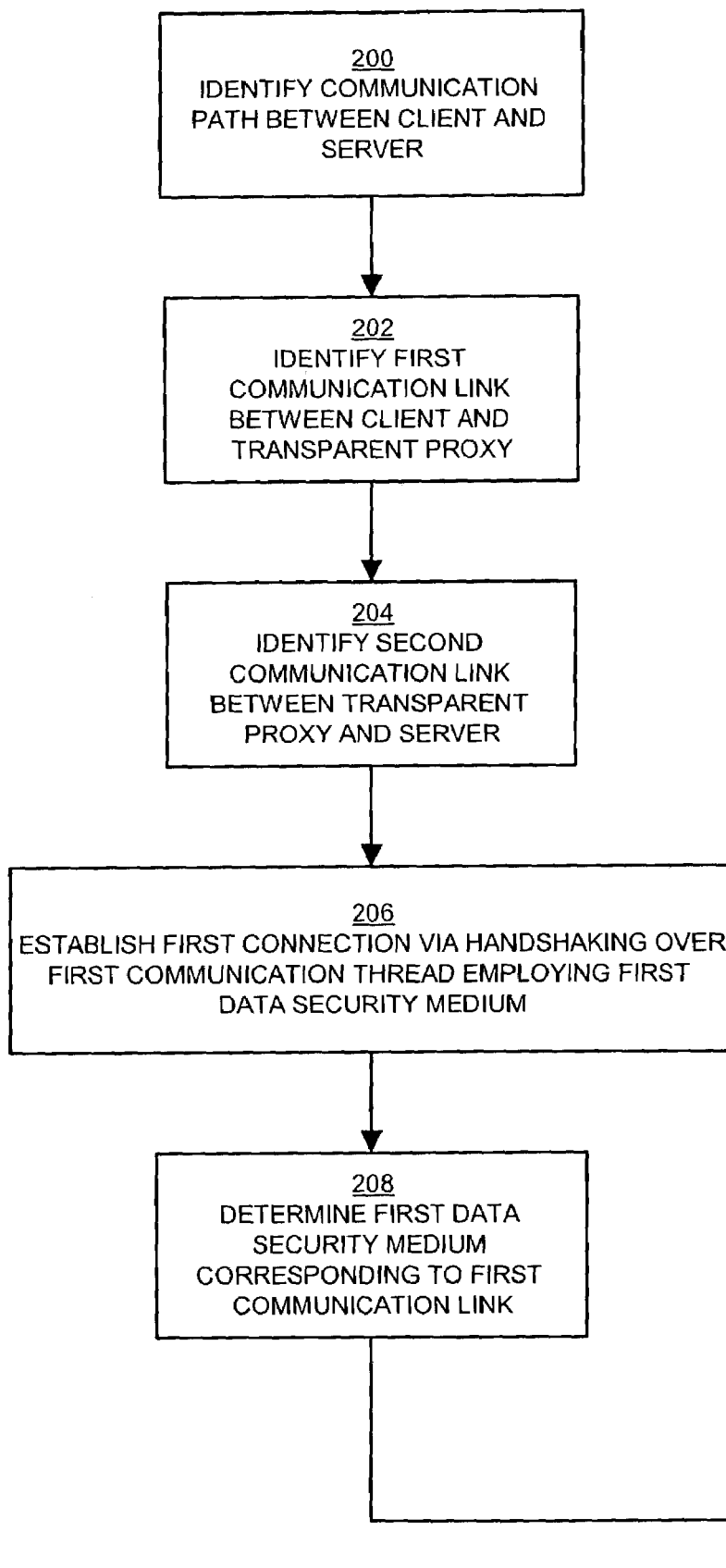
FIG. 4a is a flowchart of a procedure employed by the data security device of FIG. 3 to transmit data between a client and a server.
Figure 4B:
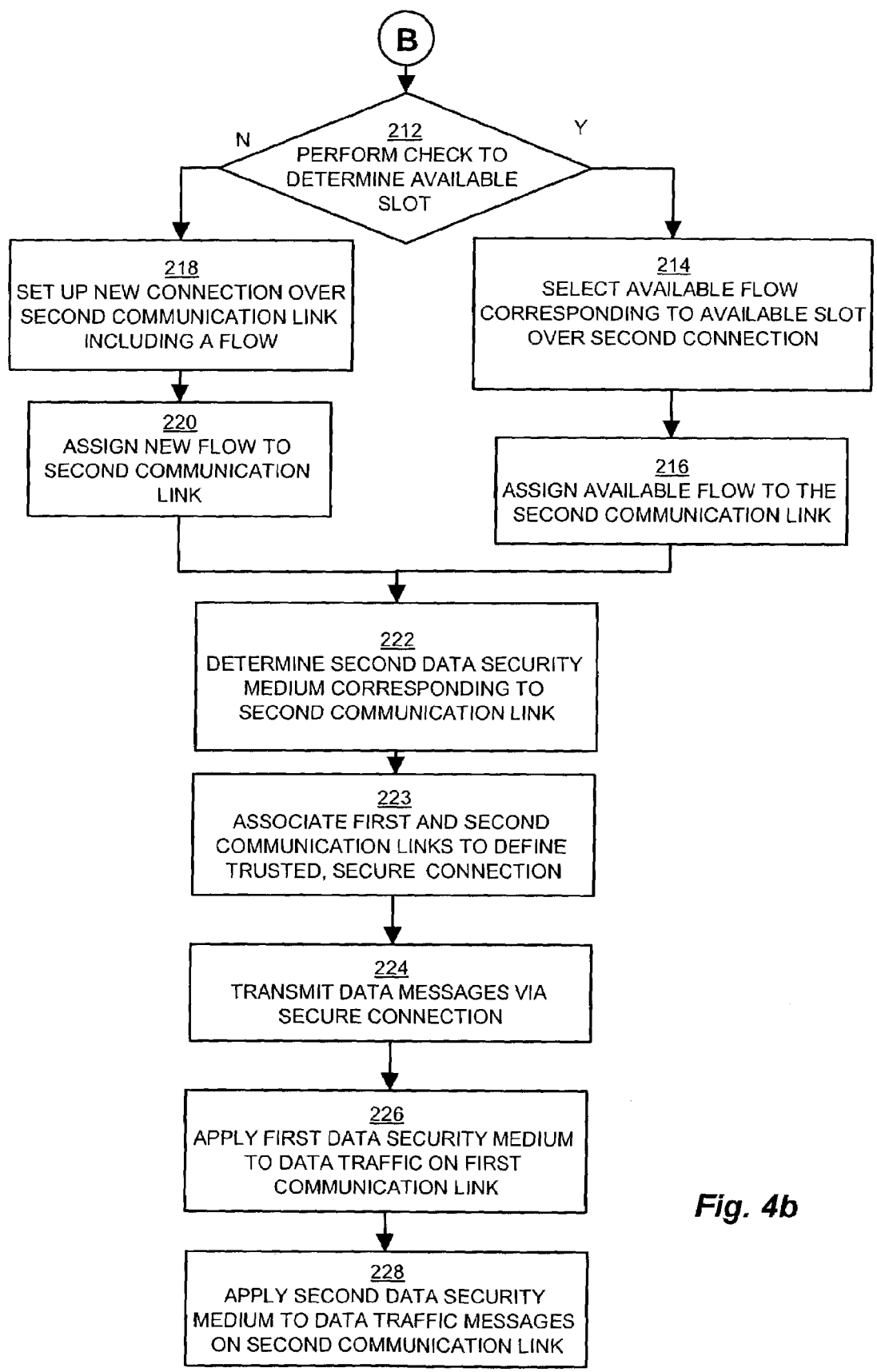
FIG. 4b is a continuation of the flowchart of FIG. 4a showing the selection of the second security medium.

FIGS. 4a and 4b are flowcharts of a procedure employed by the data security device of FIG. 3 to transmit data between a client and a server. Although illustrated sequentially for exemplary purposes, the operations performed in the steps may be implemented concurrently or within certain realtime windows. In step 200, the device identifies a communication path between the client node 14 and the server node 16-1. In step 202, the device identifies a first communication link between the client node and the transparent proxy 32. In step 204, the device identifies a second communication link between the transparent proxy 32 and the server node. The first and second communications links will combine to form the secure connection 32 from the client 14 to the server 16-1. In step 206, the server process establishes, via a handshaking exchange, a first connection between the client node 14 and the transparent proxy 32 over the first communication link. In step 208, the server process determines a first data security medium corresponding to data communications (messages) on the first communication link 30

In step 212, the transparent proxy 32 performs a check to determine if an existing connection has an available slot. A connection comprises one or more slots. Reuse of a current slot of a connection saves the current process from the overhead required to establish a new connection. In step 214, if an existing connection comprising a plurality of flows has an available slot (flow), the transparent proxy 32 identifies the second connection over the second communications link employing the second data security medium. In step 216, the transparent proxy selects and assigns the flow to the second connection. In step 218, if there is not an available flow in an existing connection, then the transparent proxy sets up new second connection over the second communications link 24-1 including a flow. In step 220, the transparent proxy assigns the new flow to the second communication link 24-1. In step 222, the transparent proxy 32 determines a second data security medium corresponding to data communications on the second data communication link 24-1. The second data security medium need not be, and in a particular configuration, is not, the same as the first data security medium, and is independent of the first data security medium. This allows a less computationally expensive security method, such as providing fewer encryption bits, on the second link to improve performance, as will be described further below.

In step 223, the transparent proxy associates the first communication link 30 and the second communication link 24-1 to define a secure connection 32 between the client 14 node and the server 16-1 node. In step 224, the client begins transmitting data traffic messages between the client 14 node and the server 16-1 node via the secure connection 38. Referring to step 226, the client 14 applies the first data security medium to the data traffic messages on the first communication link. In step 228, the transparent proxy applies the second data security medium to the data traffic messages on the second communication link. In this manner, the first data security medium remains independent of the second data security medium. Therefore, the user may employ an existing connection on the backend, such as reusing a session key, without hindering or encumbering the secure frontend connection. Further, an alternate security medium, such as IPsec or a medium based on a smaller key, and thus less computationally intensive, may be employed.

Figure 5:
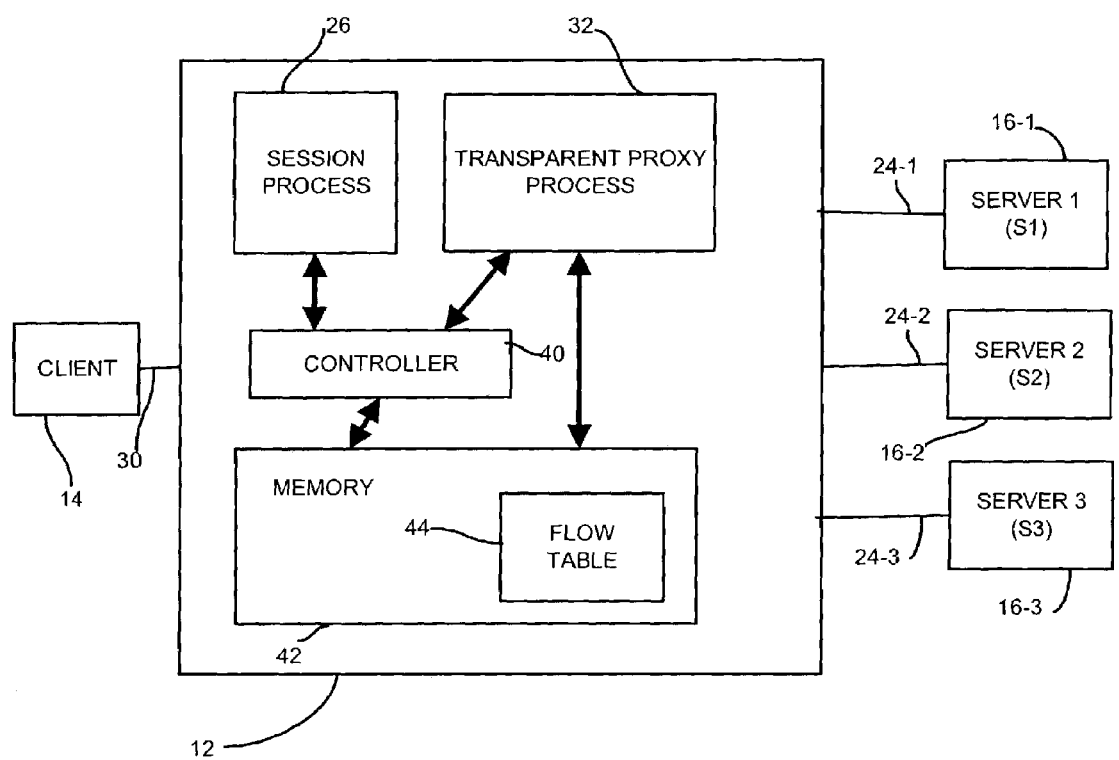
FIG. 5 is a mapping of a plurality of flows in a session through the data security device of FIG. 3.

FIG. 5 shows a mapping of a plurality of flows in a session through the data security device 12 of FIG. 3 showing the data security device 12 in greater detail. Referring to FIG. 5, the data security device 12 further includes a controller 40, such as a microprocessor, and a memory 42, having a flow table 44.

The session process 26, transparent proxy process 32, and memory 42 are in communication with and responsive to the controller 40. The session process 26 stores and receives address information, such as IP address, port number, and encryption variables from the memory 42. The transparent proxy process 32 receives the encryption variables, such as key sizes and certificates, from the memory 42. The flow table 44 stores address information associating the transparent proxy process 32 with an connection to both the client 14 and the server 16-n. The transparent proxy process 32, therefore, may retrieve information about existing flows in previously established connections and employ the existing flows in subsequent connections. Further, these connections may be SSL connections or other connections depending on the second security medium.

Each of the servers 16-1 to 16-3 is associated with links 24-1 to 24-3 respectively. Each of the links 24-n is operable to carry one or more SSL connections, each including at least one flow. The transparent proxy process 32 employs the flow table 44 to determine the flow and respective link 24-n on which to send a message. The transparent proxy process 32 therefore employs the flow table 44 lookup to reuse a session key on subsequent messages. In alternate configurations, the logical structure illustrated by the flow table 44 may be implemented in other or additional tables, and may be distributed such that the physical data resides locally with other processes (e.g. 26, 32). The transparent proxy process 32 also employs the flow table 44 to maintain server stickiness, which allows a set of contextually related messages to employ the same flow and hence, "stick" with the same server. The transparent proxy process 32 therefore employs the flow table to manage existing connections and the corresponding flows to provide session key reuse, server stickiness, and load balancing.

FIGS. 6*a*-6*d* show an alternate arrangement including a flow mapping lookup employed by the data security device of FIG. 5 in more detail. Referring to FIGS. 6*a*-6*d* and FIG. 4, in an alternate configuration, the transparent proxy process 32 retrieves flow information about existing flows to reuse the flows rather than setting up and tearing down the corresponding connections. The flow lookup enables the transparent proxy process 32 to use the encryption variables associated with the previously established connection 24-*n* (FIG. 2) to avoid incurring an additional SSL handshake. The flow lookup, therefore, allows retrieval of a session key associated with a connection in an existing flow, which may include multiple unidirectional connections and SSL state information, so that the transparent proxy 32 does not need to set up a new SSL connection. As indicated above, the transparent proxy process 32 also retrieves encryption variables such as certificates from the memory 42 to emulate the identity of the client 14 on the reused flow.

Figure 6A:
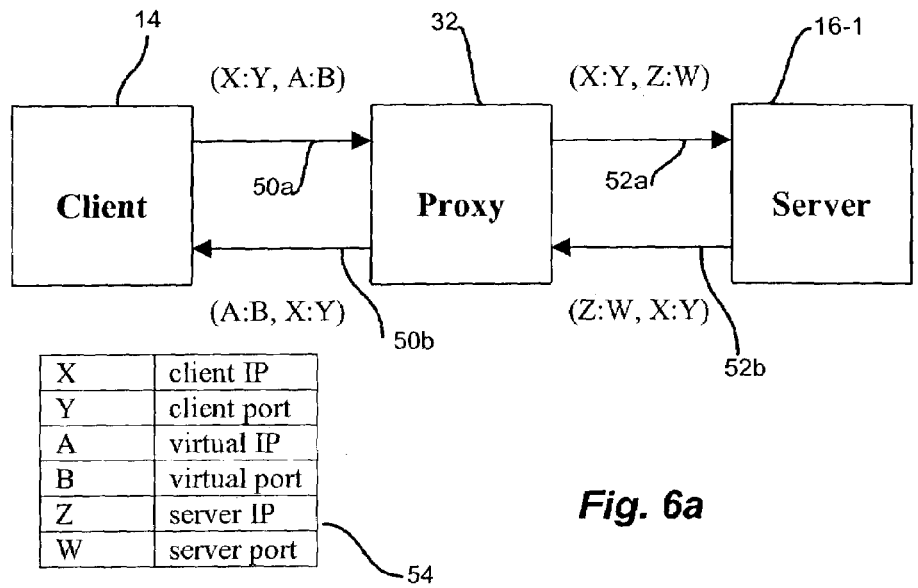
FIG. 6 is a flow mapping lookup employed by the data security device of FIG. 4 in more detail.

A flow goes from the client address to the virtual address on the proxy device to the server address. It consists of two bidirectional connections as depicted in FIG. 6*a*. From the point of view of the proxy device, the client connection is (X:Y A:B), as shown by arrow 50*a*, denoting packets arriving from the client, and the server connection is (Z:W X:Y), as shown by arrow 52*b*, denoting packets arriving from the server. The corresponding bidirectional connections are shown by arrows 50*b* and 52*a*, respectively.

The flow table includes the entries shown in FIG. 6*a*. Specifically, the flow table 44 stores entries 54 including client IP address and port X,Y, corresponding to CIP port 443 in FIG. 3; transparent proxy process 32 IP address and port A,B, corresponding to VIP:443 in FIG. 3, and server 16-*n* IP address and port Z,W, corresponding to SIP:443 in FIG. 3. The client entries 80 in the flow table 44 are indexed by the client port Y, as shown by the entry 78 for a flow in FIG. 6*b*. The last cell in the entry is used to link to another entry 78 since more than one flow can have the same client port. In one arrangement, each position in the flow table 44 is a linked list of flow entries 78. The server entries 62 in the flow table 44 are similarly indexed by the server port W.

The transparent proxy process 32 performs a flow lookup to determine the flow corresponding to the server 16-1. The flow lookup indicates to the transparent proxy if an existing backend connection has a flow or if a new backend connection is to be created. The flow lookup also provides the identity of the client 14 originating the message, optionally including the credentials of the client 14. As described above, the transparent proxy 32 stores the address of the client 14, and the security credentials, if needed, in the message so that the message will appear as if it were sent directly by the client 14. Prior art approaches merely break a secure SSL connection, and do not seamlessly emulate the client such that a message appears to have been sent directly from the client.

Figure 6B:
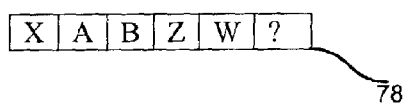

When a packet arrives with values (E:F H:I), the transparent proxy process 32 performs a flow lookup using F as the index 80 into a client portion of the flow table 44. The transparent proxy process 32 checks each entry in the linked list 82 for E=X, H=A, and I=B as shown in FIG. 6*a*. If the transparent proxy process 32 finds a match 84, we know that this packet belongs to the client connection of the matching entry. If a match is not found, the transparent proxy process 32 repeats the flow lookup using I as the index 86 into a server portion of the flow table 44 and checks each entry 78 in the linked list 88 for H=X, E=Z, and F=W as shown in FIG. 6*b*. If the transparent proxy process 32 finds a match 90, we know that this packet belongs to the server connection of the matching entry.

Figure 6C:
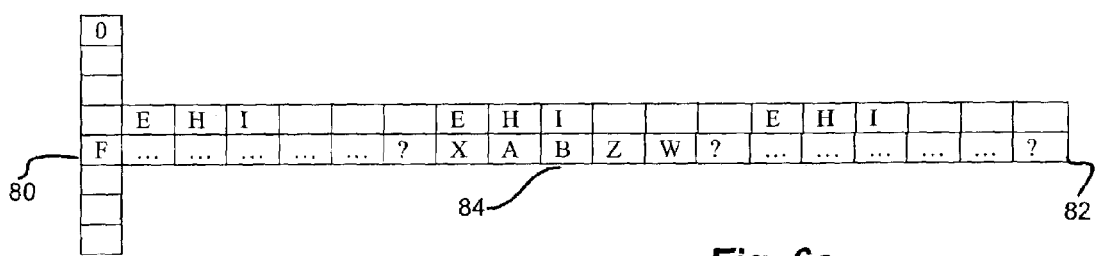
Figure 6D:
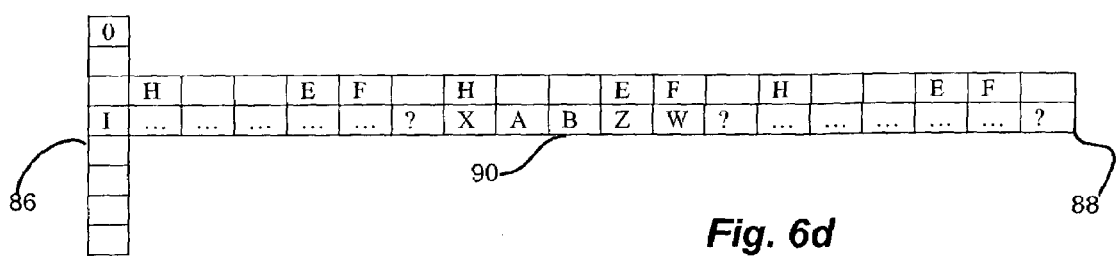

The client connection search for packet (E:F H:I) looks is shown in FIG. 6*c*, and the server connection search for packet (E:F H:I) is shown in FIG. 6*d*. Only one of these searches can succeed because the (X, A, B, Z, W) flow entry is in only one row of the flow table entries corresponding to the client.

If the transparent proxy process 32 does not find an existing flow, the proxy creates a new SSL connection from the backend endpoint 34*b* to the server 16-1. If an existing flow is found, then the connection corresponding to the found flow entry is employed. The transparent proxy addresses the message with the IP address and port from the found flow entry, SIP1:443, corresponding to an SSL connection. The transparent proxy applies the second security medium to the message, as shown in flow 36*e*, and sends the message back to the session process 26. The server process sends the message on the egress flow via port 35*f*, and to the server 16-1 on the backend link 24-1.

The server 16-1, receiving an SSL connection on port 443, treats the connection as an SSL connection emanating from the client 14. The flow lookup described above provides the information required for the transparent proxy 32 to emulate the client. If the connection is new, then the session process 26 and the server 16-1 will negotiate a new session key or other parameters using the encryption variables. The message is decrypted using the second security medium prescribed in the backend link 24-1. The server 16-1, therefore, receives an incoming message via an SSL connection from the transparent proxy 32 emulating the originating client 14.

In a particular configuration, the flow table 44 stores information or indexes to the client certificates and encryption variables, as indicated above. The transparent proxy process employs the stored certificates, and other related information such as credentials, to generate a pseudo-credential (certificate) to allow the transparent proxy to appear as (emulate) the client such that the second communication link to the server appears authenticated as if it were directly from the client, thereby resulting in the secure client-server connection. The stored certificates include X.509 certificates and Distinguished Name (DN) fields. The certificate information is employed in one of two ways.

Figure 7A:
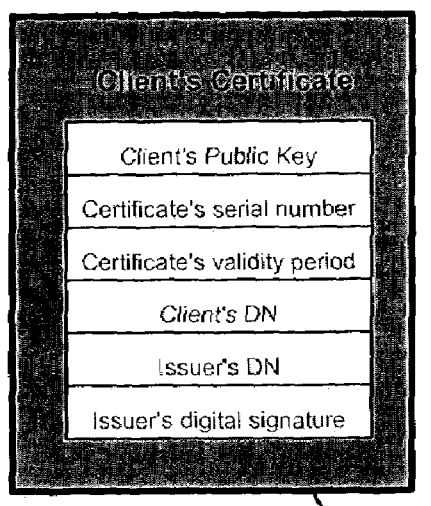
FIG. 7a is a client's certificate employed in emulating the client by the transparent proxy process using the certificate information obtained from the flow mapping shown in FIG. 6.
Figure 7B:
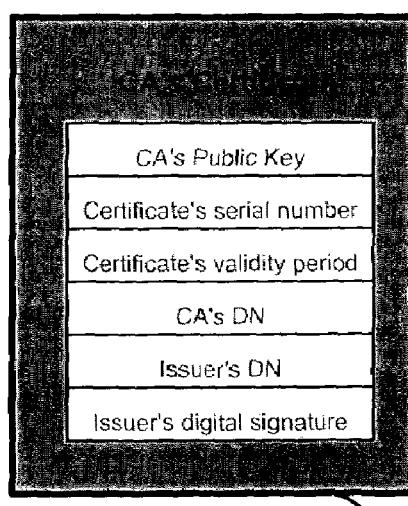
FIG. 7b is a CA's certificate employed in emulating the client by the transparent proxy process using the certificate information obtained from the flow mapping shown in FIG. 6.

FIGS. 7*a* and 7*b* show the certificates that the transparent proxy process 32 employs in emulating the client 14 by using the certificate information obtained from the flow mapping shown in FIGS. 6*a*-6*d*. Referring to FIGS. 7*a*, 7*b*, and 4 the DN (Distinguished Name) shown in both certificates 70, 72 is collection of attributes that is collectively used to identify an entity. For instance the following could combine to form a DN: Country, State/Province, Locality/City, Organization, Department, Domain, Email Address. The issuer's digital signature is a signature of all the other fields in the certificate, using the issuer's private key. In the example client certificate shown in FIG. 7*a*, the signature would be generated using the CA's private key. Since CA certificates are usually self-signed (unless they are part of a chain), the signature in FIG. 2 would most likely be done using the CA's private key as well. For simplicity assume that the CA's certificate is self signed and no chains are included.

During the SSL handshake the client 14 sends the transparent proxy process 32 its certificate 70 and the transparent proxy process 32 includes the CA's public key to check that the signature on the client certificate 70 is valid, as the server's certificate already loaded on the data security device 12 and thus known to the transparent proxy process. After the handshaking has completed, the transparent proxy 32 opens an SSL connection on the backend. The transparent proxy then acts as the client in this scenario and has an asymmetric key-pair that it will employ to complete handshake with the server, hereinafter referred to as the connection key-pair.

The transparent proxy 32 then generates a pseudo-credential (certificate) to send to the server 16-1 so that it knows the identity of the client 14 that on whose behalf the transparent proxy process 32 is proxying. In a particular configuration, the transparent proxy 32 generates the pseudo-credential using the client and issuer's certificate information 70, 72, respectively.

This configuration has the advantage of preserving all of the client certificate's information except for the digital signature. In this scenario the digital signature is done using the private portion of the connection key-pair. Accordingly, if the client decided that it wanted to authenticate the pseudo-credential, the authentication would fail because the signature would not match. However, since the CSS would have already authenticated the client's certificate 70 when doing the SSL handshake with the client, the link is already trusted and there is no need for the server 16-1 to do certificate authentication.

In an alternate configuration, the transparent proxy process 32 generates the pseudo certificate using a signer certificate/key-pair which the CSS computes during configuration. The transparent proxy 32 stores this signer certificate/key-pair in the memory 42 for the flow table 44 entry corresponding to the client, and the transparent proxy 32 uses the certificate/key-pair to sign all pseudo certificates concerning the identified server.

In another alternate configuration, the second link employs an encryption or security medium of equal or greater strength. Such a configuration may be employed for a VPN or intranet operating with particularly sensitive information such that additional processing is desirable and computationally feasible. Nonetheless, the second link employs the second security medium independently of the first security medium operating on the first link.

Those skilled in the art should readily appreciate that the programs defining a transparent network security proxy as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for defining a transparent network security proxy has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims. For example, the communications system 10 was described above as including a single access point 22 by way of example only. In other arrangements, the communication system 10 includes multiple access points 22. In such a configuration, each access point 22 employs a data communications device 12 as described herein.

What is claimed is:

1. A method, comprising:

engaging in a first authentication process to establish a first secure connection between a client and a data communications device, the first secure connection existing in an untrusted public access network and imposing a first relatively high level of endpoint security overhead onto the data communications device, the first authentication process being engaged in according to a first predetermined handshaking operation of a first protocol for establishing the first secure connection and including authenticating the client to the data communications device based on a client certificate from the client, the client certificate including (a) client information identifying the client and (b) a first digital signature of a certificate authority, the client information including (i) a client public key, (ii) a client distinguished name, and (iii) a certificate authority distinguished name, the client distinguished name including (iv) organization information identifying a client organization, and (v) address information identifying an address of the client organization;

engaging in a second authentication process to establish a second secure connection between the data communications device and a server, the server being part of a server farm disposed in a intranet configured to receive concurrent data traffic messages from a plurality of clients, the intranet being a trusted network, the second secure connection corresponding to a security level of the intranet and imposing a second relatively low level of endpoint security overhead onto the data communications device less than the first level of endpoint security overhead, the second authentication process being engaged in according to a second predetermined handshaking operation of a second protocol for establishing the second secure connection and including authenticating the data communications device to the server based on a pseudo credential generated by the data communications device and sent to the server, the pseudo credential including (a) the client information from the client certificate, and (b) a second digital signature of the data communications device, such that from the perspective of the server the second secure connection is a connection to the client and not to the data communications device, the second digital signature being generated using a key pair that is known privately between the data communications device and the server; and combining the first secure connection with the second secure connection to form a secure end-to-end connection between the client and the server, the secure end-to-end connection being utilized to exchange data traffic messages between the client and the server device such that the server views data traffic messages generated by the data communications device as trusted data traffic messages from the client.

2. The method of claim 1 wherein establishing the second secure connection comprises:
   indexing, in a flow table, a flow entry indicative of a flow; and determining, based on a matching indexed flow entry, a corresponding flow.

3. The method of claim 1 wherein establishing the second secure connections comprises:
   defining a plurality of available ciphers from a cipher suite;
   identifying encryption strength variables corresponding to the available ciphers in the cipher suite; and
   selecting an available cipher for applying on the second secure connection based on the encryption strength variables.

4. The method of claim 3 wherein identifying the encryption strength variables further comprises identifying at least one of encryption key bits, encryption type, authentication type, exportability, symmetry.

5. The method of claim 1 wherein the first and second protocols are selected from SSL (Secure Socket Layer) and IPsec/IPv4 (Internet Protocol Security/Internet Protocol Version 4).

6. The method of claim 1 wherein the key pair used to generate the second digital signature of the pseudo-credential comprises a signer certificate/key-pair, the certificate/key-pair being used to sign all pseudo credentials concerning the server.

7. A data communications device, comprising:
   first and second network interfaces configured for communication with a client and a server respectively, the client being disposed in an untrusted public access network, the server being part of a server farm disposed in an intranet configured to receive concurrent data traffic messages from a plurality of clients, the intranet being a trusted network;
   a memory configured to store connection and flow information indicative of connections to the client and server via the network interfaces;
   a session process configured to (1) engage in a first authentication process to establish a first secure connection between the client and the data communications device in the untrusted public access network, the first secure connection imposing a first relatively high level of endpoint security overhead onto the data communications device, the first authentication process being engaged in according to a first predetermined handshaking operation of a first protocol for establishing the first secure connection and including authenticating the client to the data communications device based on a client certificate from the client, the client certificate including (a) client information identifying the client and (b) a first digital signature of a certificate authority, the client information including (i) a client public key, (ii) a client distinguished name, and (iii) a certificate authority distinguished name, the client distinguished name including (iv) organization information identifying a client organization, and (v) address information identifying an address of the client organization, and (2) engage in a second authentication process to establish a second secure connection between the data communications device and the server, the second secure connection corresponding to a security level of the intranet and imposing a second relatively low level of endpoint security overhead onto the data communications device less than the first level of endpoint security overhead, the second authentication process being engaged in according to a second predetermined handshaking operation of a second protocol for establishing the second secure connection and including authenticating the data communications device to the server based on a pseudo credential generated by the data communications device and sent to the server, the pseudo credential including (c) the client information from the client certificate, and (d) a second digital signature of the data communications device, such that from the perspective of the server the second secure connection is a connection to the client and not to the data communications device, the second digital signature being generated using a key pair that is known privately between the data communications device and the server; and
   a transparent proxy process configured to combine the first secure connection with the second secure connection to form a secure end-to-end connection between the client and the server, the secure end-to-end connection being utilized to exchange data traffic messages between the client and the server device such that the server views data traffic messages generated by the data communications device as trusted data traffic messages from the client.

8. The data communications device of claim 7 further comprising a flow table having indexed flow entries indicative of a flow, and wherein the transparent proxy process is further configured to:
   index the flow entries based on a flow index; and
   determine, based on a matching indexed flow entry, a corresponding flow.

9. The data communications device of claim 7 further comprising a cipher suite having a plurality of available ciphers, the available ciphers further having corresponding encryption strength variables, and wherein the transparent proxy process is further configured to select an available cipher for applying on the second secure connection based on the encryption strength variables.

10. The data communications device of claim 9 wherein the encryption strength variables further comprise at least one of encryption key bits, encryption type, authentication type, exportability, symmetry.

11. The data communications device of claim 7 wherein the first and second protocols are selected from SSL (Secure Socket Layer) and IPsec/IPv4 (Internet Protocol Security/Internet Protocol Version 4).

12. The data communications device of claim 7 wherein the key pair used to generate the second digital signature of the pseudo-credential comprises a signer certificate/key-pair, the certificate/key-pair being used to sign all pseudo credentials concerning the server.

* * * * *